United States Patent [19]

Falardeau et al.

[11] Patent Number: 4,507,410

[45] Date of Patent: Mar. 26, 1985

[54] SILICA BONDED TIN URETHANE CATALYSTS

[75] Inventors: Edward R. Falardeau; Kurt C. Frisch, Jr.; Michele R. Lock, all of Midland, Mich.

[73] Assignee: The Dow Chemical Company, Midland, Mich.

[21] Appl. No.: 577,426

[22] Filed: Feb. 6, 1984

[51] Int. Cl.$^3$ .................. C08G 18/24; C08K 3/36; B01J 21/08; B01J 23/14

[52] U.S. Cl. ................................. 523/211; 502/242; 502/152; 502/170; 502/171; 521/111; 521/122; 524/874; 523/216; 528/58

[58] Field of Search ........... 502/242, 152, 170, 171; 523/211, 216; 524/874; 528/58; 521/111

[56] References Cited

U.S. PATENT DOCUMENTS

| | | | |
|---|---|---|---|
| 3,927,052 | 12/1975 | Vizurraga | 502/152 |
| 3,935,051 | 1/1976 | Bender | 523/216 |
| 4,045,527 | 8/1977 | Babayan | 528/58 |

FOREIGN PATENT DOCUMENTS

| | | | |
|---|---|---|---|
| 7811090 | 5/1980 | Netherlands | 523/216 |
| 947587 | 1/1964 | United Kingdom | 528/58 |

*Primary Examiner*—C. Warren Ivy
*Attorney, Agent, or Firm*—D. L. Corneglio

[57] ABSTRACT

A solid catalyst composition comprising a silica or silica-treated compound and a tin catalyst compound bonded to the surface of the silica compound which is not deactivated in the presence of silica or silica-treated compounds. A process for preparing the solid catalyst by contacting a silica compound containing reactive hydroxyl groups with a tin catalyst compound at a temperature range from about 130° to 165° C. under dynamic conditions whereby the tin catalyst compound bonds to the silica compound. Generally, after the reaction, at least a portion of the hydroxyl groups present on the silica compound are absent and, more preferably, substantially all the isolated hydroxyl groups are absent. A urethane composition containing the solid catalyst is also provided wherein the solid catalyst is not deactivated by the addition of silica or silica-treated compounds.

15 Claims, No Drawings

SILICA BONDED TIN URETHANE CATALYSTS

BACKGROUND OF THE INVENTION

The present invention generally relates to a solid catalyst composition and a process for preparing the solid catalyst. Furthermore, the present invention provides for a polyurethane catalyst which maintains its activity in the presence of silica or silica-treated fillers.

In the field of urethane chemistry many variables exist to modify or enchance the physical characteristics of a polyurethane composition. The type of catalyst employed is one such variable. The catalyst can vary the reaction rate of the isocyanate group to provide different branching, crosslinking and chain extension. The reaction rate itself is also important as, for example, in reaction injection molding (RIM) where a fast cure rate is necessary.

Another important variable in a polyurethane composition is the filler. Fillers provide reinforcement, tensile strength, compression set and shrink resistance to the compound. They also increase the compound's volume which has the economic incentive of lowering cost. Various fillers useful in urethane compositions are taught in U.S. Pat. Nos. 3,441,523 and 3,150,109. Those fillers known to be particularly useful in polyurethane systems include silica, milled glass fibers, wollastonite and carbon black.

Silica is especially useful as a reinforcing filler because it does not interfere with the color imparted by a pigment added to the composition. Where no pigments are employed a silica filler will yield a light colored final product suitable for painting. One disadvantage, however, is that the free silanol groups present on silica and silica-treated fillers deactivate urethane catalysts to result in long cure times or complete deactivation. This is especially a problem when short cures are necessary as in reactive injection molding (RIM) processes where fillers, such as silica, are employed. A dilemma is thus created. To reduce the filler content would change the physical properties and increase the stock's cost, while to accept a longer cure rate would make injection molding very difficult. It, therefore, would be advantageous to create a catalyst which would not be deactivated when added to a polyurethane composition which contains a silica or silica-treated filler.

A catalyst insensitive to free silanols would be especially valuable in the area of polyurethane RIM manufacture.

Polyurethane RIM already plays a significant role in the automobile industry with applications in front and rear fascia, bumpers, and many interior applications. Silica fillers can be advantageously employed in this area; however, in the automotive applications area, the use of polyurethane RIM for exterior body applications or in other large part applications require a resistance to heat sag along with an ability to manufacture at high production rates, which means relatively fast cure rates. Therefore, a catalyst which is not deactivated by the silica or silica-treated fillers is critical.

SUMMARY OF THE INVENTION

The present invention provides for a solid catalyst composition comprising a silica or silica-treated compound and a tin catalyst compound bonded to the surface of the silica or silica-treated compound. The silica compound contains reactive hydroxyl groups and can be fumed silica. The tin catalyst compound contains a Sn—O—X bond where X is H, Cl, Br, —SnR$_3$ or —(O)R where R is an alkyl group. The preferred tin compounds are dialkyltin dilaurate or stannous octoate.

The present invention further provides a process for preparing a solid catalyst composition comprising contacting a silica or silica-treated compound containing reactive hydroxyl groups with a tin catalyst compound and reacting these compounds at a temperature range from about 130° to about 165° C. under dynamic conditions whereby the tin catalyst compound bonds to the surface of the silica or silica-treated compound. The tin catalyst compound contains a Sn—O—X bond wherein X is a H, Cl, Br, SnR$_3$ or (O)R where R is an alkyl group. The silica compound can be fumed silica and the tin compound can be dialkytin dilaurate or stannous octoate. Generally, the conditions of reaction comprise dynamically heating the reactants at a temperature range from about 130° to about 165° C. until least a portion of the hydroxyl groups present on the silica surface are absent. More preferably, substantially all of the isolated hydroxyl groups present on the silica surface are absent.

Even further, the present invention provides a urethane composition comprising a urethane elastomer and the solid catalyst composition of the invention as described above. The urethane composition can additionally comprise silica or silica-treated fillers. A major advantage provided by the present invention is that the subject catalyst is not deactivated by the presence of silica or silica-treated fillers in the polyurethane system. Still further, the present urethane composition shows excellent resistance to heat sag.

DETAILED DESCRIPTION OF THE INVENTION

New urethane catalysts are prepared by the reaction of a tin catalyst with the surface silanol groups of a silica compound. The process disclosed provides a solid catalyst composition in which the tin materials are covalently bound to the silica surface. These new solid catalysts have increased activity over conventional catalysts in the presence of silica or silica-treated fillers. In particular, the new catalysts are not deactivated in the presence of silica or silica-treated fillers when properly prepared in accordance herewith.

The term "tin compound", as used herein, is meant to include active tin containing catalysts of the type which contain a Sn—O—X bond where X is hydrogen, Cl, Br, —SnR$_3$ and —(O)R wherein R is an alkyl group can be used in the formation of the subject solid catalysts. More preferably such known tin catalyst as dibutyltin dilaurate and stannous octoate can be successfully employed. Both of these catalysts are particularly excellent urethane catalysts and, therefore, can be treated such that they can be employed in a polyurethane system containing a silica or silicone treated filler.

The term "silica compound", as used herein, is meant to include those compounds which contain reactive silanol sites. Reactive silanol sites describes hydroxyl groups present on the surface of the silica compounds. A broad range of potential silica compounds containing hydroxyl groups can be employed. The group of silica compounds known as fumed silica are excellent choices. This is due to the very abundant reactive silanol sites or hydroxyl groups present. For example, one type of commercially available fumed silica is Cab—O—Sil M-5 which has approximately 1.3 mmol SiOH/g SiO$_2$.

Cab—O—Sil M-5 is a trademark of the Cabot Corporation. More generally, fumed silica can be prepared by methods known in the art such as the flame hydrolysis of silicon tetrachloride.

Generally, the solid catalyst is prepared by reacting the tin catalyst compound with the hydroxyl groups present on the silica compound. The reaction is carried out under conditions sufficient to react the desired amount of hydroxyl groups which can be monitored by infrared spectra of the reactant product. This is made possible by the presence of at least two different types of hydroxyl groups on the silica surface. These groups are identified as (1) the isolated hydroxyl group which is attached to a surface silicon atom surrounded by siloxane groups (Si—O—Si), and characterized by the infrared absorbance peak at approximately 3760 cm$^{-1}$, and (2) the hydrogen-bonded hydroxyl groups, resulting from the presence of hydroxyl groups attached to neighboring surface silicon atoms, which are characterized by a broad peak at 3700 to 3500 cm$^{-1}$. The subject reaction is recognized by the decrease in size of the isolated hydroxyl group band at approximately 3760 cm$^{-1}$ and the formation of a band at 1720 cm$^{-1}$ representing a carbonyl stretching frequency. The carbonyl stretching frequency is contributed by the presence of the tin compound. More preferably, the infrared spectrum will reveal the disappearance of the band at 3760 cm$^{-1}$ which indicates the complete absence of the isolated hydroxyl groups from the silica surface.

While a process to prepare the solid catalyst composition has been developed, the exact structures are unknown. The structures, however, are believed to be quite complex in view of the various reaction conditions which affect and do not affect the subject catalysts formation as described herein below.

With respect to the proportion of tin compound to silica compound to be reacted, it has been discovered that this parameter is not critical. From as little as 0.3 percent to an excessive 120 percent of tin compound with respect to isolated hydroxyl groups present on the silica compound can be employed to still achieve a deactivation resistant catalyst. For example, a 1:1 and a 1:2 proportion of dibutyltin dilaurate to fumed silica have been reacted in a 4 liter reactor with successful results. In both situations complete disappearance of the silanol absorption band at 3760 cm$^{-1}$ was observed indicating complete loss of the isolated hydroxyl groups and, therefore, the complexity of the reaction.

Further, it has been found that although the preferred reaction involves the substantial reaction of all the isolated hydroxyl groups present on the surface of the silica compound with the tin compound to form the subject solid catalyst compound smaller portions can be adequate. For example, the tin catalyst compound can be first reacted with a major portion of the silica compound filler to be employed in the polymer system whereby only a small proportion of the total isolated hydroxyl groups present on the silica compound are reacted. It has been discovered that this will also produce a nondeactivating catalyst. Therefore, a tin catalyst compound prereacted with the major portion of the silica compound under the conditions described herein will not be deactivated. This method, however, presents the disadvantage of having to react larger amounts of material whereas in the preferred process the formation of smaller amounts of the solid catalyst composition can be more easily handled and added to a polymer system to which additional unreacted silica or silica-treated filler can be added.

With respect to reaction conditions, it has been found that a temperature range from about 130° to about 165° C. can be employed; however, temperatures at the higher end of the range are preferred. More preferably, the reaction temperature is about 150° C. In addition to reaction temperature, it is critical to react the tin and silica compounds under dynamic conditions. This feature was demonstrated when attempts to prepare the subject solid catalyst by mixing at ambient temperature followed by a static heat-treatment at 150° C. failed to produce a deactivation resistant catalyst. The problem was shown to be the static heat-treatment. This was confirmed by taking a sample of ambient temperature mixed material and reacting it in a 4-liter reactor at 150° C. with stirring which produced the active catalyst of the invention. Dynamic treatment of the reaction components during the reaction process has, therefore, been found to be necessary to produce the subject catalyst. Dynamic treatment can be by stirring, agitation, mixing by mechanical means or other means generally known in the art to provide good interaction and contact between the reactants.

With respect to other reaction parameters it has been found that predrying the silica or the atmosphere over the reaction was not important in the preparation of the subject solid catalyst. Thus, the silica compound can be added to the reaction vessel without pretreatment and the reaction can be conducted under ambient air.

By means of illustration, the following example for preparing the subject catalyst is provided. The procedures employed are not limitations and other methods known to those skilled in the art can be advantageously employed.

EXAMPLE A—CATALYST PREPARATION

In a one liter resin pot under a nitrogen flow 22.4 g of Cab-O-Sil M-5 fumed silica was dehydrated by stirring in the absence of solvent for 2 hours at 350° C. to remove surface water. This dehydration step, however, is not necessary and can be omitted without detrimental results. At ambient temperature, 23° C., 10.5 g of dibutyltin dilaurate was added to the stirred silica under nitrogen via a syringe through a septum cap in the reactor over a 20 minute period. The system was allowed to stir for 1 hour and then heated to 100° C. for 1 hour with stirring followed by an additional 2 hours at 130° C. with stirring. The resulting mixture was allowed to cool and collect. The reaction product recovered was a white powder similar in physical appearance to underivatized fumed silica. The solid tin catalyst was not deactivated in the B component (polyol and chain extender components) of a urethane system and in the presence of silica filler; however, over extended contact it began to slowly deactivate. This was due to the low reaction temperature of preparation of only 130° C. A higher reaction temperature, as demonstrated in Example B, would yield a solid tin catalyst which is not deactivated.

An IR spectra of the reaction product was performed wherein significant reduction of the fumed silica's surface silanol groups was observed.

EXAMPLE B—HIGHLY LOADED (45 PERCENT) DIBUTYLTIN DILAURATE FUMED SILICA SYNTHESIS

To a 4-liter reactor equipped with a heating mantle, stirrer, $N_2$ inlet and rubber septum to facilitate liquid additions by syringe is charged 59.4 g of Cabosil M-5 fumed silica. The reactor is then heated to 150° C. with stirring in order to fluidize the fumed silica. A 23.8 ml amount of dibutyltin dilaurate is added dropwise by syringe to the fluidized fumed silica. The amount of tin catalyst in this particular example represents approximately a 50 percent stiochiometric amount with respect to the isolated hydroxyl groups present on the fumed silica surface. The solid tin catalyst formed would not deactivate in the presence of silica or silica-treated fillers.

The reaction is monitored by the disappearance of the isolated hydroxyl absorption band 3760 cm$^{-1}$ and the appearance of an absorption band at 1720 cm$^{-1}$.

The utility of the solid catalyst formed from the reaction of silica with the tin catalyst, as described above, is especially useful in curing polymer systems which contain silica or silicone treated fillers. More specifically, the solid catalyst of the present invention can be employed in urethane polymer systems which contain silica type or silicone treated fillers without becoming deactivated.

The silica-tin solid catalyst of the subject invention can be employed in a polymer composition in a range of from about 0.02 to about 10 parts per hundred parts rubber (phr). More preferably, the catalyst can be employed from about 0.1 to 0.5 phr. It has been discovered, however, that as the proportion of catalyst is increased the viscosity of the composition also increases due to the silica portion of the solid catalyst. This effect is especially noticeable when the solid catalyst exceeds the 9.0 phr range.

The increased viscosity caused by the catalyst is not believed to create an upper limitation inasmuch as the filler content can be adjusted to compensate for the silica contributed by the catalyst. Thus, the amount of catalyst employed is limited only by the artisan's ability to process an increased viscosity composition where high levels of catalyst are employed.

Of comparatively recent development is the technique of reaction injection molding (RIM), in which a two-part semi-liquid resin blend is flowed through a nozzle into a mold cavity, wherein it polymerizes. In a urethane RIM system Component A contains the isocyanate portion of the urethane system and Component B contains the polyol and activating agent or chain extender. The two components, A and B, must be mixed with the greatest care for satisfactory results. Isocyanate resins (urethanes) and epoxy resins are well adapted to this fast, low-energy process.

The subject catalyst has special utility in (RIM) urethane systems which employ silica or silica-treated fillers for reinforcement. Normally, the presence of free silanol groups on the surface of silica or silica-treated fillers would deactivate a catalyst such that the cure rate would occur too slowly for application in a RIM process. The solid catalyst of this invention, however, can be employed either alone or in conjunction with silica or silica-type fillers without significant deactivation such that the cure rate is satisfactory for the RIM procedure. The catalyst would be added to the B component portion of the duel component RIM process. This implies that the solid catalyst will have to remain in contact with the filler materials while awaiting injection into the mold where it will then react with the A component, isocyanate, portion of the urethane system. The solid catalyst must, therefore, be able to withstand extended exposure to silica filler without deactivating.

The solid catalyst of the invention has the ability to remain active despite prolonged exposure to silica which heretobefore would have deactivated a catalyst's activity. Table I, entitled "Catalyst Deactivation In A Polyurethane System", demonstrates the improved performance of the subject solid catalyst. The testing was conducted by admixing the two components of a polyurethane RIM system and measuring gel time. The A component consisted of a "liquid" methylene-diphenyl isocyanate (commercially available from the Upjohn Company as Isonate ®143L, a carbodiimide modified methylene diphenyl isocyanate) and the B component comprised 93 parts per hundred polyol (php) of a polyether polyol (commercially available from The Dow Chemical Company as Voranol ®4702 a high primary alcohol content polyether polyol of approximately 5000 molecular weight), 7 php of an amine terminated polypropylene oxide (commercially available from the Jefferson Chemical Company as Jeffamine ®D-400, a primary amine terminated difunctional polyether polyol of 400 molecular weight), 30 php of ethylene glycol and the catalyst and filler as indicated in the table which follows.

TABLE I

| Example | Catalyst | Fumed Silica (php) | Reaction Temperature | B Component Resident Time[3] | Gel Time |
|---|---|---|---|---|---|
| 1 | DBTDL[1] | 0 | 25° C. | 1 minute | 6 seconds |
| 2 | DBTDL[1] | 3.0 | 25° C. | 1 minute | 13 minutes |
| 3 | DBTDL/Silica[2] | 0 | 25° C. | 1 minute | 25 seconds |
| 4 | DBTDL/Silica[2] | 6.0 | 25° C. | 48 minutes | 25 seconds |

[1]Dibutyltin dilaurate; not an example of the invention.
[2]Dibutyltin dilaurate reacted with fumed silica; the solid catalyst of the invention.
[3]Amount of time the catalyst was in contact with ingredients of the B Component: 93.0 php Voranol 4702 (polyether polyol), 7.0 php Jeffamine ® D-400 (amine terminated polypropylene oxide), and 30 php ethylene glycol.

As indicated by Example 2, the fumed silica significantly increases the gel time over non-silica systems, Example 1. Example 3 shows a longer gel time than a system which contains no silica (Example 1) but the gel time is significantly better than Example 2 and is sufficiently fast enough for RIM processing. Example 4 demonstrates that even after long exposure of the catalyst to additional silica the reaction time is not effected.

An important advantage to being able to employ fumed silica or silica-treated fillers in a polyurethane RIM system is in the area of structural property improvements. Structural properties such as impact resistance and heat sag resistance are a few examples.

These properties would be especially valuable in the manufacture of substitutes for automobile metal parts, such as body and molding trim members. With respect to heat sag resistance, the polyurethane component must be able to be cured rapidly in an injection mold process and be able to withstand a painting procedure. The painting procedure would entail being subjected to intense drying heat and, therefore, it is important that the subject article to be painted has sufficient sag resistance. The impact resistance characteristic would be a self-evident requirement.

It has been discovered, that in addition to the subject catalyst's improved reactivity in the presence of a silica or silica-treated filler, that the final product has excellent resistance to heat sag. To show this improvement three silica containing urethane elastomers (Examples 5, 6 and 7) were prepared. Examples 5 and 6 were prepared with a dibutyltin dilaurate catalyst and Example 7 was prepared with the solid catalyst of the invention. The Examples were prepared as follows:

PREPARATION OF URETHANE ELASTOMER EXAMPLES 5, 6 AND 7

All parts are in parts per hundred polyol (php) unless otherwise indicated. To three 500-ml polyethylene bottles equipped with lids was added 100 parts of a polyether polyol (commercially available from The Dow Chemical Company as Voranol ®4701, a low primary alcohol content polyether polyol of approximately 5000 molecular weight), 20 parts of an amine chain extender (commercially available from the Polaroid Company as Polacure ®740-M, an aromatic diamine chain extender) and 5 parts fumed silica. Additionally, Example 7 had 0.20 parts of the solid catalyst (DBTDL/silica) added. The mixtures were dispersed for 1 minute on a Hamilton Beach Mixer at high speed, placed in 500-ml round bottomed flasks with Teflon stirrers, stirred and heated to 140° C. for 3 hours to melt the Polacure (solid). When a uniform material was obtained, the mixtures were cooled to 110° C. A vacuum adapter was attached and the samples were degassed for 1.5 hours to remove $H_2O$ at about 4 mm Hg. The samples were then cooled to room temperature and the appropriate amount of the uniform mixtures (B component of a urethane system) were added to 400-ml propylene beakers. A liquid methylene diphenyl isocyanate (Isonate ®143L of the Upjohn Company) which is the A component of a urethane system was added to each beaker using a slight molar excess isocyanate to active hydrogen compounds of 1:05/1.0. The active hydrogens are the polyol, amine chain extender and silica. The DBTDL tin catalyst was then added to Examples 5 and 6. The mixtures were stirred using an air driven motor with propeller for 15 seconds. The mixtures were poured into 95° C. molds treated with mold release, the tops put on, placed into a press (95° C.) and pressed to about 5,000 lbs. The elastomers were cured in the press for 30 minutes at 95° C., removed and cooled to room temperature.

Twenty-four hours later, 127 mm×25 mm×3.1 mm strips were cut. The cut strips were subjected to a standard test method for high-temperature sag of microcellular urethanes—ASTM D3769-79.

Briefly, the test involved clamping one end of the sample while the remainder was left unsupported and heated to 125° C. for 60 minutes. The unsupported end of the sample was then measured to determine the amount of sag with respect to the supported end. The results obtained are compiled in Table II, entitled "Heat Sag Resistance".

TABLE II

| | | Heat Sag Resistance | | |
|---|---|---|---|---|
| Example | Catalyst Type | Amount (php) | Silica (php) | Heat Sag @ 125° C. |
| 5 | DBTDL[1] | .23 | 5.0 | 10.2 mm |
| 6 | DBTDL[1] | .20 | 5.0 | 12.7 mm |
| 7 | DBTDL/silica[2] | .20 | 5.0 | 1.8 mm |

[1]Dibutyltin dilaurate; not an example of the invention.
[2]Dibutyltin dilaurate reacted with fumed silica; the solid catalyst of the invention.

The results show a significant improvement in heat sag resistance when the DBTDL/silica catalyst (Example 7) of the subject invention is employed. This excellent result demonstrates the utility of the subject invention in urethane reaction injection molding elastomers.

What is claimed is:

1. A solid catalyst composition suitable for use in polyurethane systems produced by
   (1) contacting a silica compound containing reactive hydroxyl groups with a tin catalyst compound, and
   (2) reacting said compounds at a temperature range from about 130° to about 165° C. under dynamic conditions whereby said tin catalyst compound is bonded to the surface of said silica compound by reacting with said reactive hydroxyl groups.

2. The silica compound of claim 1 which is fumed silica.

3. The composition of claim 1 wherein said tin catalyst compound contains a Sn—O—X bond where X is H, Cl, Br, —SnR$_3$ or —(O)R where R is an alkyl group.

4. The tin catalyst compound of claim 3 which is dialkyltin dilaurate or stannous octoate.

5. A process for preparing a solid catalyst composition, suitable for use in polyurethane systems, comprising:
   (1) contacting a silica compound containing reactive hydroxyl groups with a tin catalyst compound, and
   (2) reacting said compounds at a temperature range from about 130° to about 165° C. under dynamic conditions whereby said tin catalyst compound is bonded to the surface of said silica compound by reacting with said reactive hydroxyl groups.

6. The process of claim 5 wherein said compounds are reacted under conditions such that at least a portion of the hydroxyl groups present on the surface of said silica compound are absent.

7. The process of claim 5 wherein substantially all of the isolated hydroxyl groups present on the surface of said silica compound are absent.

8. The process of claim 5 wherein said silica compound is fumed silica.

9. The process of claim 5 wherein said tin catalyst compound contains a Sn—O—X bond where X is H, Cl, Br, —SnR$_3$ or —(O)R where R is an alkyl group.

10. The process claim 10 wherein the tin catalyst compound is dialkyltin dilaurate or stannous octoate.

11. A urethane composition comprising a urethane elastomer, and a solid catalyst composition comprising a silica compound containing reactive hydroxyl groups, and a tin catalyst compound bonded to the surface of said silica compound by reacting with said reactive hydroxyl groups.

12. The urethane composition of claim 11 which additionally comprises a silica filler.

13. The urethane composition of claim 11 wherein said silica compound is fumed silica.

14. The urethane composition of claim 11 wherein said tin catalyst compound contains a Sn—O—X bond where X is H, Cl, Br, —SnR$_3$ or —(O)R where R is an alkyl group.

15. The tin catalyst compound of claim 14 which is dialkyltin dilaurate or stannous octoate.

* * * * *